US008172020B2

(12) United States Patent
Gilmore et al.

(10) Patent No.: US 8,172,020 B2
(45) Date of Patent: May 8, 2012

(54) WHEEL CASING WITH EMBEDDED ROTOR FOR HUB MOTOR

(75) Inventors: Curt D. Gilmore, Fenton, MI (US); Herbert Adams, Waterford, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 12/992,201

(22) PCT Filed: Apr. 28, 2009

(86) PCT No.: PCT/US2009/041913
§ 371 (c)(1),
(2), (4) Date: Nov. 11, 2010

(87) PCT Pub. No.: WO2009/140054
PCT Pub. Date: Nov. 19, 2009

(65) Prior Publication Data
US 2011/0061956 A1    Mar. 17, 2011

Related U.S. Application Data

(60) Provisional application No. 61/053,732, filed on May 16, 2008.

(51) Int. Cl.
*B60K 1/00* (2006.01)
(52) U.S. Cl. .................................................. 180/65.51
(58) Field of Classification Search ............... 180/65.51
See application file for complete search history.

(56) References Cited

U.S. PATENT DOCUMENTS

| | | | | |
|---|---|---|---|---|
| 643,854 A * | 2/1900 | Whittlesey | ............ | 310/67 R |
| 3,548,965 A * | 12/1970 | Pierro | ............ | 180/65.51 |
| 6,710,498 B1 * | 3/2004 | Lee et al. | ............ | 310/211 |
| 7,347,295 B2 * | 3/2008 | Kurata | ............ | 180/65.51 |
| 2003/0047363 A1 * | 3/2003 | Makuta et al. | ............ | 180/65.5 |
| 2004/0079567 A1 * | 4/2004 | Beltrame et al. | ............ | 180/65.5 |
| 2004/0099455 A1 | 5/2004 | Nagaya | | |
| 2005/0045392 A1 * | 3/2005 | Maslov et al. | ............ | 180/65.5 |
| 2006/0158050 A1 | 7/2006 | Maeda et al. | | |
| 2007/0017718 A1 * | 1/2007 | Chrobak | ............ | 180/65.5 |
| 2007/0107959 A1 | 5/2007 | Suzuki et al. | | |
| 2007/0251742 A1 * | 11/2007 | Adams et al. | ............ | 180/65.2 |
| 2008/0070736 A1 * | 3/2008 | Yoshino et al. | ............ | 475/149 |

FOREIGN PATENT DOCUMENTS

| | | |
|---|---|---|
| JP | 2006-199107 A | 8/2006 |
| WO | 02-083446 A1 | 10/2002 |

OTHER PUBLICATIONS

International Search Report for PCT/US2009/041913, mailed Nov. 24, 2009; ISA/KR.
Written Opinion for PCT/US2009/041913, mailed Nov. 24, 2009; ISA/KR.
International Preliminary Report of Patentability (Chapter I) for PCT/US2009/041913, issued by the International Bureau of WIPO on Nov. 17, 2010.

\* cited by examiner

*Primary Examiner* — John R Olszewski
(74) *Attorney, Agent, or Firm* — Harness, Dickey & Pierce, P.L.C.

(57) ABSTRACT

A vehicle drivetrain with a wheel and an inside-out motor. The wheel includes a hub and a rim that is disposed about the hub. The rim includes a sealing bead that is configured to sealingly engage the opposite sidewalls of an inflatable tire. The inside-out motor includes a rotor that is at least partially disposed in the rim.

20 Claims, 2 Drawing Sheets ic illustration of a vehicle having a
WHEEL CASING WITH EMBEDDED ROTOR FOR HUB MOTOR The present invention generally relates to vehicle drivetrains with electric wheel motors and more particularly to a vehicle drivetrain with an inside-out electric motor whose rotor is disposed within a rim of a wheel.

Drivetrains for electric and hybrid electric vehicle commonly employ wheel motors to generate propulsive power. U.S. Pat. No. 7,059,437 describes a wheel motor in which the rotor of the wheel motor is received into the inner diameter of the wheel and glued to the rim. We have noted that construction of a wheel and wheel motor assembly in such manner suffers from several drawbacks, including cost, weight and size.

SUMMARY

In one form, the present teachings provide a vehicle drivetrain that includes a wheel and a rotor. The wheel has a hub and an annular rim that is coupled to a radially outward portion of the hub. The rim includes a pair of spaced apart sealing beads that are adapted to sealingly engage opposite sidewalls of a tire. The rotor is at least partially encased in the rim.

In another form, the present teachings provide a vehicle drivetrain with a wheel and an inside-out motor. The wheel has a hub and a rim that extends about the hub. The hub includes a mounting means for mounting the wheel to a spindle. The rim includes an annular flange member, which is coupled to the hub, and a pair of wall members that are coupled to the flange member and which extend outwardly therefrom away from the rotational axis of the wheel. The inside-out motor has a rotor that is disposed at least partially in the rim.

In yet another form, the present teachings provide a method for constructing a vehicle drivetrain. The method includes: providing a wheel having a hub and a rim that is disposed about the hub; coupling an inside-out motor to the wheel, the inside out motor including a rotor, the rotor being disposed at least partially in the rim; and coupling an inflatable tire to the wheel, the inflatable tire having a pair of opposite sidewalls that sealingly engage opposite sides of the rim.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE VARIOUS EMBODIMENTS

Figure 1:
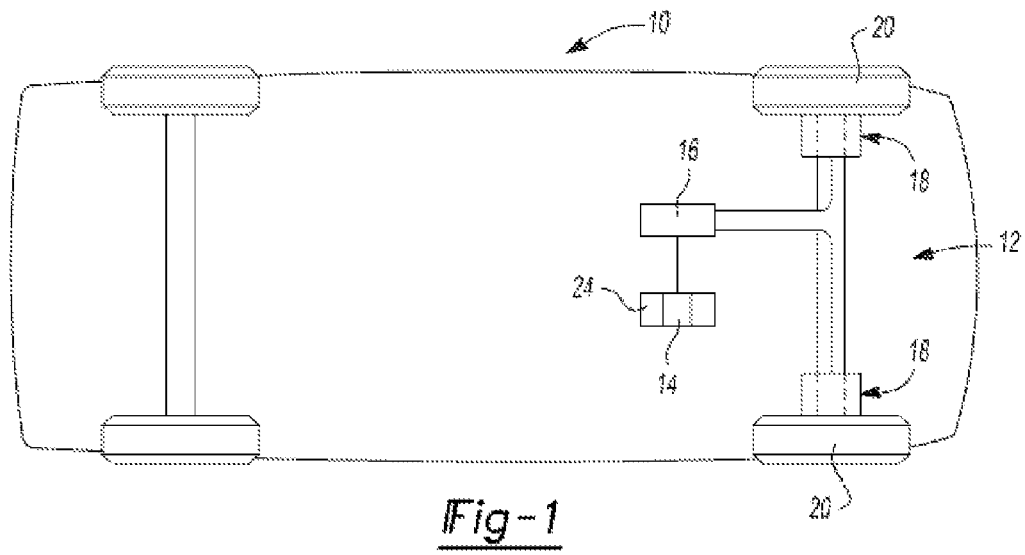
FIG. 1 is a schematic illustration of a vehicle having a driveline constructed in accordance with the teachings of the present disclosure.

With reference to FIG. 1 of the drawings, a vehicle constructed in accordance with the teachings of the present invention is generally indicated by reference numeral 10. The vehicle 10 can include an electric or hybrid electric drivetrain 12 with a source of electrical power 14, a controller 16 and a plurality of wheel motors 18 for generating rotary power to drive corresponding vehicle wheels 20. The source of electrical power 14 can be any type of electrical power source, but in the example provided includes a battery set 24 that outputs direct current electrical power that can be selectively applied to one or more of the wheel motors 18. It will be appreciated that the direct current power output from the battery set 24 could be provided directly to the wheel motors 18, or could be manipulated (e.g., transformed up or down in voltage, employed to provide electrical power via a pulse-width modulated technique, converted to alternating current power) as desired prior to the application of electrical power to the wheel motors 18. The controller 16 can regulate the supply of electrical power from the source of electrical power 14 to thereby control the operation of the wheel motors 18.

Figure 2:
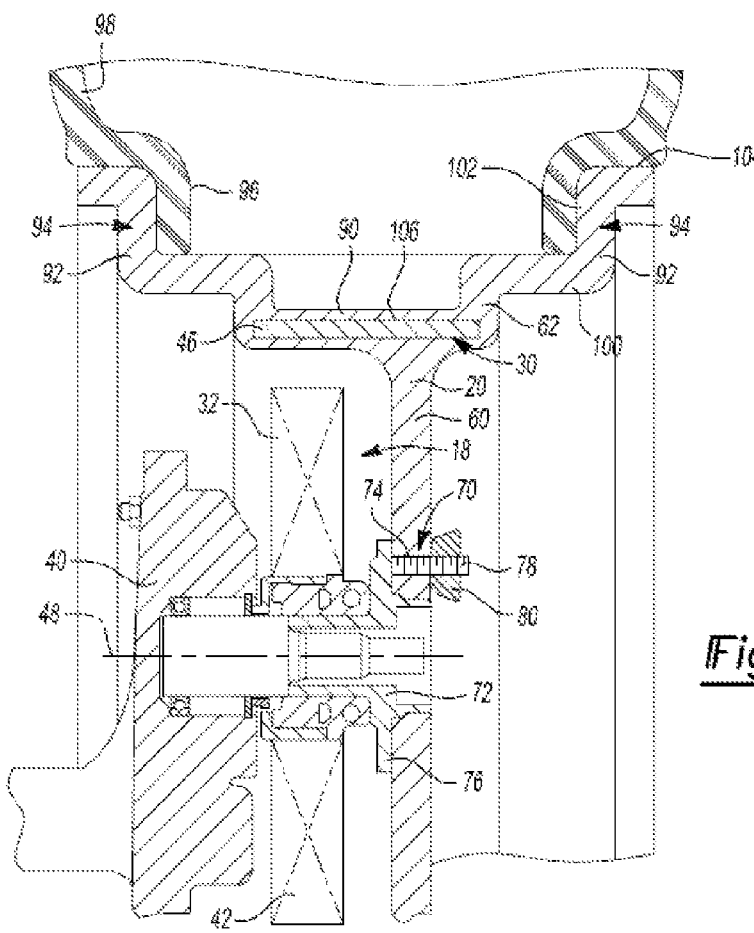
FIG. 2 is a sectional view of a portion of the vehicle of FIG. 1, illustrating the wheel and the wheel motor in more detail.
Figure 3:
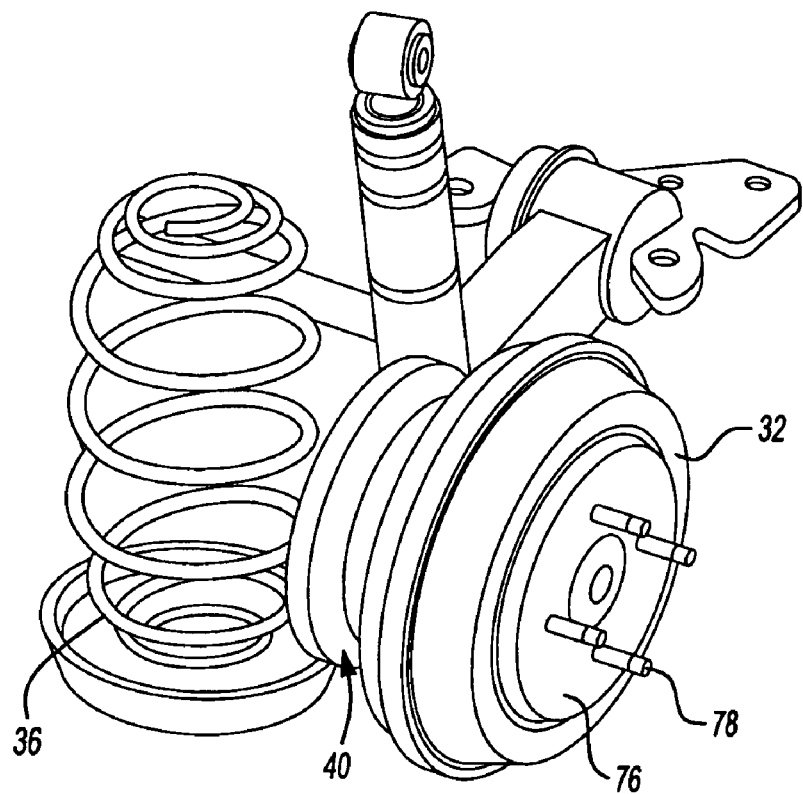
FIG. 3 is a perspective view of a portion of the vehicle of FIG. 1, illustrating the stator and the spindle in more detail.
Figure 4:
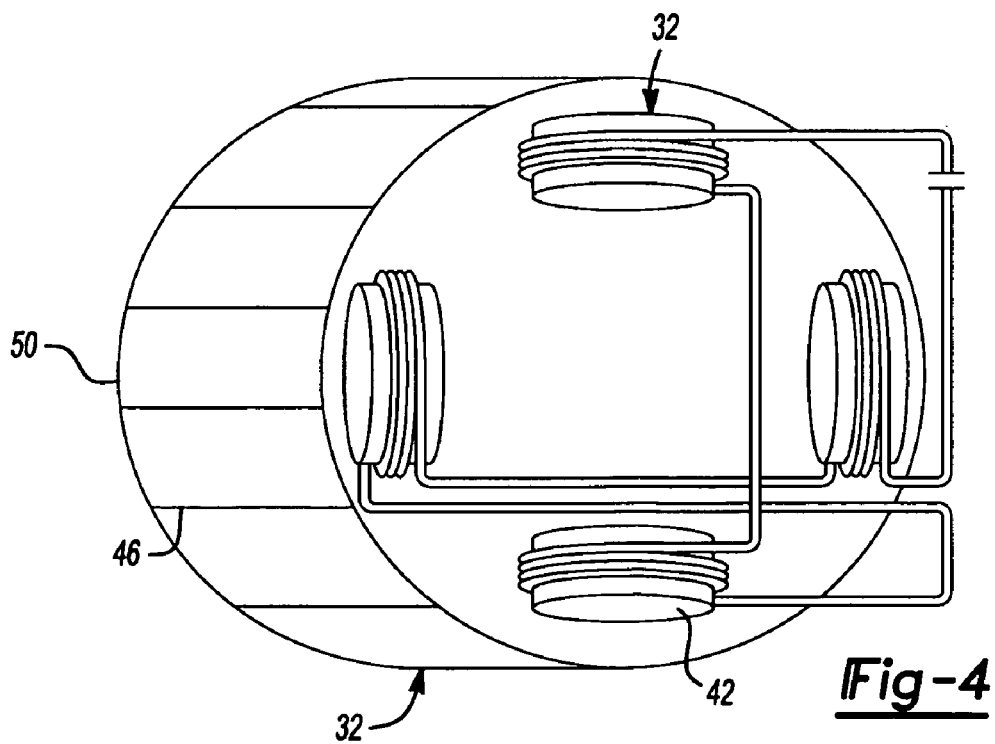
FIG. 4 is a schematic illustration of a portion of the vehicle of FIG. 1, illustrating the stator and the rotor.

With reference to FIGS. 2 through 4, each of the wheel motors 18 can have an inside-out configuration in which the rotor 30 of the wheel motor 18 is disposed radially outwardly of its stator 32. The stator 32 can be fixedly coupled to a suitable vehicle structure, such as a wheel spindle 40, and electrically coupled to the controller 16 and the source of electrical power 14. The stator 32 can include a plurality of field windings 42 that produce a radially outwardly directed magnetic field (i.e., the magnetic fields are directed toward the rotor 30). The rotor 30 can be any type of rotor, such as a squirrel cage rotor having a plurality of bars 46, which can extend generally parallel to the rotational axis 48 of the rotor 30, and a pair of annular end members 50 that can be coupled to the opposite ends of the bars 46. The bars 46 can be formed of a conductive material, such as copper or aluminum.

Each wheel 20 can include a hub 60 and a rim 62 that can be coupled to and extend circumferentially about the hub 60. The hub 60 and the rim 62 can be formed as discrete components that are coupled together, or could be unitarily formed from a suitable material, such as aluminum.

The hub 60 can include a mounting means 70 that permits the wheel 20 to be fixedly but removably coupled to a spindle 72. The mounting means 70 can include one or more holes 74 that can extend through the hub 60 to receive a corresponding quantity of fasteners for securing the hub 60 to the spindle 72. For example, the spindle 72 can include a mounting flange 76 having a plurality of threaded studs 78 extending therefrom; the threaded studs 78 can be received into the holes 74 in the hub 60 and lug nuts 80 can be employed to fixedly but removably couple the hub 60 to the mounting flange 76.

The rim 62 can include an annular flange member 90 and a pair of wall members 92. The flange member 90 can be coupled directly to and extend circumferentially about the hub 60. The wall members 92 can be coupled to the flange member 90 and can extend radially outwardly therefrom away from the rotational axis 48 of the wheel 20. The wall members 92 can define a pair of spaced apart sealing beads 94 that can be configured to sealingly engage the opposite sidewalls 96 of a tire 98. Each sealing bead 94 can include a first portion 100, a second portion 102 and a third portion 104. The first portion 100 can be directly coupled to the flange member 90 and can be disposed concentrically about the rotational axis 48 of the wheel 20. The second portion 102 can be directly coupled to a distal end of the first portion 100 and can extend radially outwardly therefrom. The third portion 104 can be directly coupled to a distal end of the second portion 102 and can extend generally transverse to the second portion 102. For example, the third portion 104 can be generally concentric with the first portion 100.

The rotor 30 can be mounted to the wheel 20 such that at least a portion of the rotor 30 is disposed in the rim 62. In the particular example provided, the rotor 30 is cast into or encased in the rim 62. An insulating material 106 can be disposed between the material that forms the rim 62 and the rotor 30. In other words, as the rotor 30 includes the plurality of conductive bars 46 disposed concentrically about the rotational axis 48 of the wheel 20, the insulating material 106 can be disposed between each of the bars 46 and the rim 62. Alternatively, a potting compound can be disposed between the rotor 30 and the rim 62. Construction of the wheel motor 18 in this manner permits the rotor 30 to be packaged into an existing vehicle component (i.e., the wheel 20) to thereby reduce both weight and the number of components in the assembly, as well as to increase the size of the rotor 30 (relative to a prior art rotor such as that which is disclosed in U.S. Pat. No. 7,059,437) so as to be able to generate higher amounts of torque.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A vehicle drivetrain comprising:
    a wheel having a hub and an annular rim that is coupled to a radially outward portion of the hub, the rim including a pair of spaced apart sealing beads that are adapted to sealingly engage opposite sidewalls of a tire; and
    a rotor having a plurality of bars, each of the plurality of bars having an axis extending parallel to a rotational axis of the wheel and each of the plurality of bars disposed concentrically about the rotational axis of the wheel, wherein the plurality of bars are coupled at first ends to a first annular end member and at second ends to a second annular end member, wherein each of the plurality of bars is cast entirely within the annular rim.

2. The vehicle drivetrain of claim 1, wherein the rotor is a squirrel cage rotor.

3. The vehicle drivetrain of claim 1, wherein each sealing bead includes a first portion, which is disposed concentrically about a rotational axis of the wheel, and a second portion that is coupled to an outer end of the first portion, the second portion extending radially outwardly from the rotational axis.

4. The vehicle drivetrain of claim 3, wherein each sealing bead includes a third portion that is coupled to an end of the second portion opposite the first portion, wherein the third portion extends transverse to the second portion.

5. The vehicle drivetrain of claim 4, wherein the third portion is concentric with the first portion.

6. The vehicle drivetrain of claim 1, wherein the rim is unitarily formed of aluminum.

7. The vehicle drivetrain of claim 6, wherein the rim and the hub are unitarily formed.

8. The vehicle drivetrain of claim 1, wherein an insulating material is disposed between each of the bars and the rim.

9. A vehicle drivetrain comprising:
    a wheel having a hub and a rim that extends about the hub, the hub including mounting means for mounting the wheel to a spindle, the rim including an annular flange member, which is coupled to the hub, and a pair of wall members that are coupled to the flange member and which extend outwardly therefrom away from a rotational axis of the wheel; and
    an inside-out motor having a rotor fully cast in the rim, wherein the rotor includes a plurality of elongate bars disposed concentrically about the rotational axis of the wheel, wherein the plurality of elongate bars are coupled at first ends to a first annular end member and at second ends to a second annular end member.

10. The vehicle drivetrain of claim 9, wherein the rotor is a squirrel cage rotor.

11. The vehicle drivetrain of claim 9, wherein the rim is unitarily formed of aluminum.

12. The vehicle drivetrain of claim 11, wherein the rim and the hub are unitarily formed.

13. The vehicle drivetrain of claim 9, wherein an insulating material is disposed between each of the bars and the rim.

14. The vehicle drivetrain of claim 9, wherein the elongate bars are formed from a conductive material.

15. The vehicle drivetrain of claim 14, wherein the conductive material is one of copper and aluminum.

16. A method for constructing a vehicle drivetrain, the method comprising:
    providing a wheel having a hub and a rim that is disposed about the hub;
    coupling an inside-out motor to the wheel, the inside out motor including a rotor cast entirely in the rim; and
    coupling an inflatable tire to the wheel, the inflatable tire having a pair of opposite sidewalls that sealingly engage opposite sides of the rim.

17. The method of claim 16, wherein the rotor is a squirrel cage rotor.

18. A vehicle drivetrain comprising:
    a wheel having a hub and an annular rim that is coupled to a radially outward portion of the hub, the hub and the rim being unitarily formed of aluminum, the rim including a pair of spaced apart sealing beads that are adapted to sealingly engage opposite sidewalls of a tire, each of the sealing beads including a first portion, which is disposed concentrically about a rotational axis of the wheel, a second portion, which is coupled to an outer end of the first portion and which extends radially outwardly from the rotational axis and a third portion that is coupled to an end of the second portion opposite the first portion, wherein the third portion extends transverse to the second portion, wherein the third portion is concentric with the first portion; and
    a squirrel cage rotor having a plurality of elongate bars disposed concentrically about the rotational axis of the wheel and cast entirely within the annular rim, a first annular end member coupled to a first end of each of the plurality of elongate bars, and a second annular end member coupled to a second end of each of the plurality of elongate bars, wherein an insulating material is disposed between each of the bars and the rim.

19. The vehicle drivetrain of claim 18, wherein the elongate bars are formed from a conductive material.

20. The vehicle drivetrain of claim 19, wherein the conductive material is one of copper and aluminum.

* * * * *